United States Patent
Redenbo et al.

(10) Patent No.: US 10,640,952 B2
(45) Date of Patent: May 5, 2020

(54) SYSTEM AND METHOD FOR MODIFYING A MATERIAL MOVEMENT PLAN

(71) Applicant: Caterpillar Inc., Peoria, IL (US)

(72) Inventors: Seth J. Redenbo, Metamora, IL (US); Troy K. Becicka, Sahuarita, AZ (US); Mo Wei, Dunlap, IL (US); Kyle Edwards, Sahuarita, AZ (US); Michael Taylor, Wexford, PA (US)

(73) Assignee: Caterpillar Inc., Peoria, IL (US)

( * ) Notice: Subject to any disclaimer, the term of this patent is extended or adjusted under 35 U.S.C. 154(b) by 250 days.

(21) Appl. No.: 15/374,396

(22) Filed: Dec. 9, 2016

(65) Prior Publication Data

US 2018/0163376 A1 Jun. 14, 2018

(51) Int. Cl.
*E02F 9/00* (2006.01)
*E02F 9/26* (2006.01)
*E02F 3/76* (2006.01)
*E02F 3/84* (2006.01)
*G05D 1/02* (2020.01)
*E02F 9/20* (2006.01)

(52) U.S. Cl.
CPC ............ *E02F 9/262* (2013.01); *E02F 3/7609* (2013.01); *E02F 3/841* (2013.01); *E02F 9/205* (2013.01); *G05D 1/0212* (2013.01); *E02F 3/7604* (2013.01); *G05D 2201/0202* (2013.01)

(58) Field of Classification Search
None
See application file for complete search history.

(56) References Cited

U.S. PATENT DOCUMENTS

| | | | |
|---|---|---|---|
| 3,301,599 A | 1/1967 | Heimaster | |
| 5,140,907 A | 8/1992 | Svatek | |
| 5,194,689 A | 3/1993 | Cummins | |
| 5,409,298 A | 4/1995 | Dickerson et al. | |
| 5,636,903 A * | 6/1997 | Dickerson | E02F 3/52 172/829 |
| 5,875,854 A | 3/1999 | Yamamoto et al. | |
| 6,108,949 A | 8/2000 | Singh et al. | |
| 6,128,574 A | 10/2000 | Diekhans | |
| 6,191,732 B1 * | 2/2001 | Carlson | E02F 3/842 342/357.3 |

(Continued)

FOREIGN PATENT DOCUMENTS

| CN | 103470262 A | 12/2013 |
|---|---|---|
| CN | 104405397 A | 3/2015 |

(Continued)

*Primary Examiner* — Truc M Do
(74) *Attorney, Agent, or Firm* — Leydig, Voit & Mayer, Ltd.

(57) ABSTRACT

A system for moving material with a work implement includes an image display device, an operator input device, and a position sensor. A controller is configured to determine a position of a work surface at a work site, display a portion of the work site on the image display device including an operational location at the work area, modify a position of the operational location on the image display device with the operator input device to define a modified operational location, generate a material movement plan based upon the position of the work surface and modified operational location, and generate command instructions to move the machine according to the material movement plan.

20 Claims, 9 Drawing Sheets

(56) References Cited

U.S. PATENT DOCUMENTS

| | | | |
|---|---|---|---|
| 6,363,632 B1 | 4/2002 | Stentz et al. | |
| 6,522,964 B1* | 2/2003 | Miki | E02F 9/205 |
| | | | 172/315 |
| 6,823,616 B1 | 11/2004 | Gutter et al. | |
| 7,010,425 B2 | 3/2006 | Gray et al. | |
| 7,658,234 B2* | 2/2010 | Brandt | A01B 63/112 |
| | | | 172/7 |
| 8,315,789 B2 | 11/2012 | Dunbabin et al. | |
| 8,616,297 B2* | 12/2013 | Shintani | E02F 3/7609 |
| | | | 172/407 |
| 8,639,393 B2 | 1/2014 | Taylor et al. | |
| 8,706,363 B2 | 4/2014 | Stratton et al. | |
| 8,868,302 B2 | 10/2014 | Everett et al. | |
| 8,948,981 B2 | 2/2015 | Wei et al. | |
| 8,983,738 B2 | 3/2015 | Avitzur et al. | |
| 9,133,600 B2 | 9/2015 | Martinsson et al. | |
| 9,410,811 B2 | 8/2016 | Pfaff et al. | |
| 9,783,955 B1* | 10/2017 | Clar | E02F 1/00 |
| 10,082,025 B2* | 9/2018 | MacDonald | E21C 41/26 |
| 2004/0210370 A1* | 10/2004 | Gudat | E02F 3/435 |
| | | | 701/50 |
| 2008/0180523 A1* | 7/2008 | Stratton | G05D 1/0044 |
| | | | 348/114 |
| 2008/0208415 A1* | 8/2008 | Vik | E21C 41/26 |
| | | | 701/50 |
| 2008/0243345 A1* | 10/2008 | Knight | E02F 3/84 |
| | | | 701/50 |
| 2014/0180444 A1* | 6/2014 | Edara | G05D 1/0088 |
| | | | 700/56 |
| 2014/0180547 A1* | 6/2014 | Edara | G01N 33/00 |
| | | | 701/50 |
| 2014/0240506 A1* | 8/2014 | Glover | H04N 7/181 |
| | | | 348/159 |
| 2014/0257645 A1* | 9/2014 | Date | E02F 9/267 |
| | | | 701/50 |
| 2014/0277957 A1* | 9/2014 | Clar | E02F 5/32 |
| | | | 701/50 |
| 2014/0371947 A1* | 12/2014 | Stratton | G01C 7/04 |
| | | | 701/1 |
| 2015/0199847 A1* | 7/2015 | Johnson | G09G 5/377 |
| | | | 345/633 |
| 2016/0069045 A1* | 3/2016 | Wei | E02F 9/2025 |
| | | | 701/50 |
| 2016/0124635 A1* | 5/2016 | Covington | G06F 3/04886 |
| | | | 345/440 |
| 2016/0343095 A1* | 11/2016 | Wei | G06Q 50/08 |

FOREIGN PATENT DOCUMENTS

| | | |
|---|---|---|
| CN | 104763429 A | 7/2015 |
| CN | 105781554 A | 7/2016 |

* cited by examiner

SYSTEM AND METHOD FOR MODIFYING A MATERIAL MOVEMENT PLAN

TECHNICAL FIELD

This disclosure relates generally to controlling a machine and, more particularly, to a system and method for modifying a material movement plan in connection with an image display device.

BACKGROUND

Machines such as dozers, motor graders, wheel loaders, excavators, etc., are used to perform a variety of tasks. For example, these machines may be used to move material at a work site. The machines may operate in an autonomous or semi-autonomous manner to perform these tasks in response to commands generated as part of a work plan for the machines. The machines may receive instructions in accordance with the work plan to perform operations including digging, loosening, carrying, etc., different materials at the work site such as those related to mining, earthmoving and other industrial activities.

Autonomously operated machines may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks.

Material movement plans are often developed by a planning system or module. A plurality of variables may be set or determined that affect the planning system and impact the material movement plan. In some instances, an operator may desire to change the manner in which a machine is operating at the work site.

U.S. Pat. No. 8,639,393 discloses a machine for moving material including various sensors and an offboard planner. The offboard planner may generate an excavation plan based upon a characteristic of an intended work area, a characteristic of the machine, and a desired change in the intended work area. The machine may be operated autonomously based upon input from the sensors and the excavation plan.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system is provided for moving material with a work implement on a machine at a work site including an image display device, an operator input device, a position sensor and a controller. The position sensor being configured to generate position signals indicative of a position of a work surface at the work site. The controller being configured to receive position signals from the position sensor, determine the position of the work surface based upon the position signals, and display a portion of the work area on the image display device including an operational location at the work site. The controller further being configured to modify a position of the operational location on the image display device with the operator input device to define a modified operational location, generate a material movement plan based upon the position of the work surface and modified operational location, and generate command instructions to move the machine according to the material movement plan.

In another aspect, a controller-implemented method of moving material with a work implement on a machine includes receiving position signals from a position sensor indicative of a position of a work surface at a work site, determining the position of the work surface based upon the position signals, and displaying a portion of the work site on an image display device including an operational location at the work site. The method further includes modifying a position of the operational location on an image display device with an operator input device to define a modified operational location, generating a material movement plan based upon the position of the work surface and modified operational location, and generating command instructions to move a machine according to the material movement plan.

In still another aspect, a machine includes a prime mover, a work implement for moving material at a work site, an image display device, an operator input device, and a position sensor for generating position signals indicative of a position of a work surface at the work site. A controller is configured to receive position signals from the position sensor, determine the position of the work surface based upon the position signals, and display a portion of the work area on the image display device including an operational location at the work site. The controller further being configured to modify a position of the operational location on the image display device with the operator input device to define a modified operational location, generate a material movement plan based upon the position of the work surface and modified operational location, and generate command instructions to move the machine according to the material movement plan.

DETAILED DESCRIPTION

Figure 1:
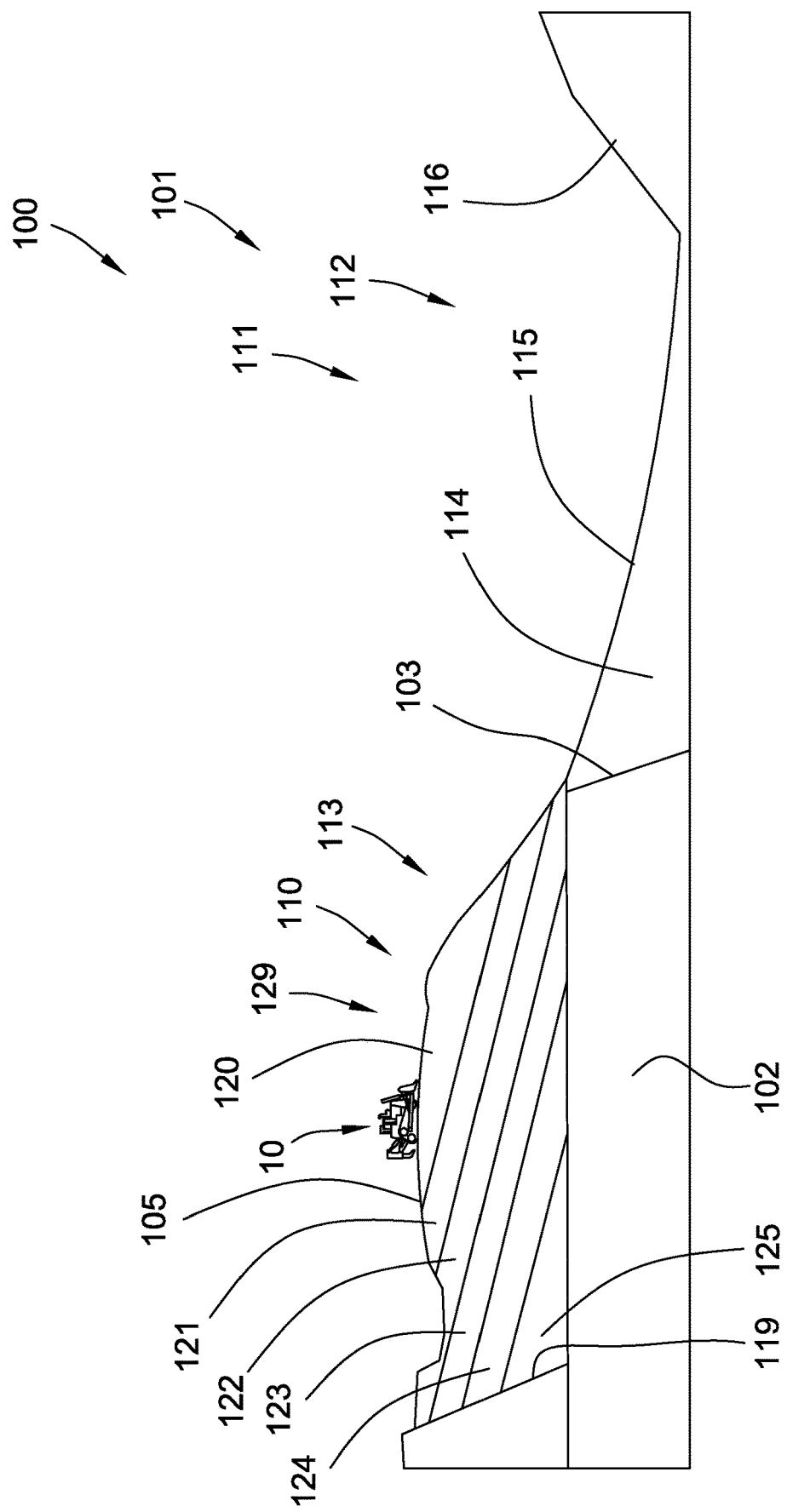
FIG. 1 depicts a diagrammatic cross-section of a portion of a work site with upper and lower layers of material illustrated.

FIG. 1 depicts a diagrammatic illustration of a portion 101 of a work site 100 which one or more machines may operate in an autonomous, a semi-autonomous, or a manual manner. Work site 100 is depicted as a mining site with lower layer 102 of material to be mined such as coal and an upper layer 105 of material such as overburden or topsoil that covers the lower layer. At some work sites 100, the overburden is removed from above a portion of the lower layer 102 of material at a first work area 110 and moved to a second work area 111. The exposed lower layer 102 of material is then removed and transported to a desired location at a remote site. The removal of the lower layer 102 of material creates an open area or void 112 into which overburden from a new or adjacent section of the upper layer 105 may be moved to expose another or adjacent portion of the lower layer. The process may be repeated about the work site 100 until the entire lower layer 102 of material is removed.

In some instances, the process of movement of the overburden may begin by moving a portion of the overburden into the void 112 adjacent the lower layer 102 such as with explosives. As depicted in FIG. 1, a portion of the upper layer 105 has been moved or displaced into the void 112 (to the right of the edge 103 of the lower layer 102 in FIG. 1). The area from which the overburden has been removed is indicated generally at 113 and the overburden moved into the void 112 is indicated at 114.

As a result of the movement of the overburden, by explosives and/or otherwise, the void 112 may have a shape as generally depicted in FIG. 1 with a first sloped surface 115 that slopes downward from generally adjacent the edge 103 of the lower layer 102 and a second sloped surface formed during a previous material movement process that extends upward from the first sloped surface. The second sloped surface may extend upward any desired distance and may be referred to as a low wall 116. In some instances, the upper end of the low wall 116 may be approximately at the same height as the upper surface of the lower layer 102. The remaining space of the void 112 is thus defined by the first sloped surface 115 and the low wall 116.

In instances in which machines such as a rope shovel (not shown) are not available, other machines 10 such as dozers may be used to move the overburden above the lower layer 102 to expose the lower layer for subsequent mining. To do so, the machines 10 may move the overburden into and above the void 112 by moving a series of relatively small layers or sections of material into the open area.

As used herein, a layer may refer to a layer or a section of material having a uniform or non-uniform (e.g., triangular) thickness or cross-section. For example, as depicted in FIG. 1, the remaining portion of the upper layer 105 of overburden to be removed is divided into a series of relatively smaller layers 120-125. Each smaller layer 120-125 may be moved from its position above the lower layer 102 to a position in or above the void 112 by utilizing the dozers to perform a series of material moving operations during which the overburden is moved from the first work area 110 to the second work area 111 to eventually expose the lower layer 102. In some instances, it may be desirable to leave a small amount of overburden on the lower layer 102 of material. Although depicted with six smaller layers 120-125, the upper layer 105 may be divided into any desired number of smaller layers. The number and position of the smaller layers may be determined by a planning system 48 described below or in any other manner.

Figure 2:
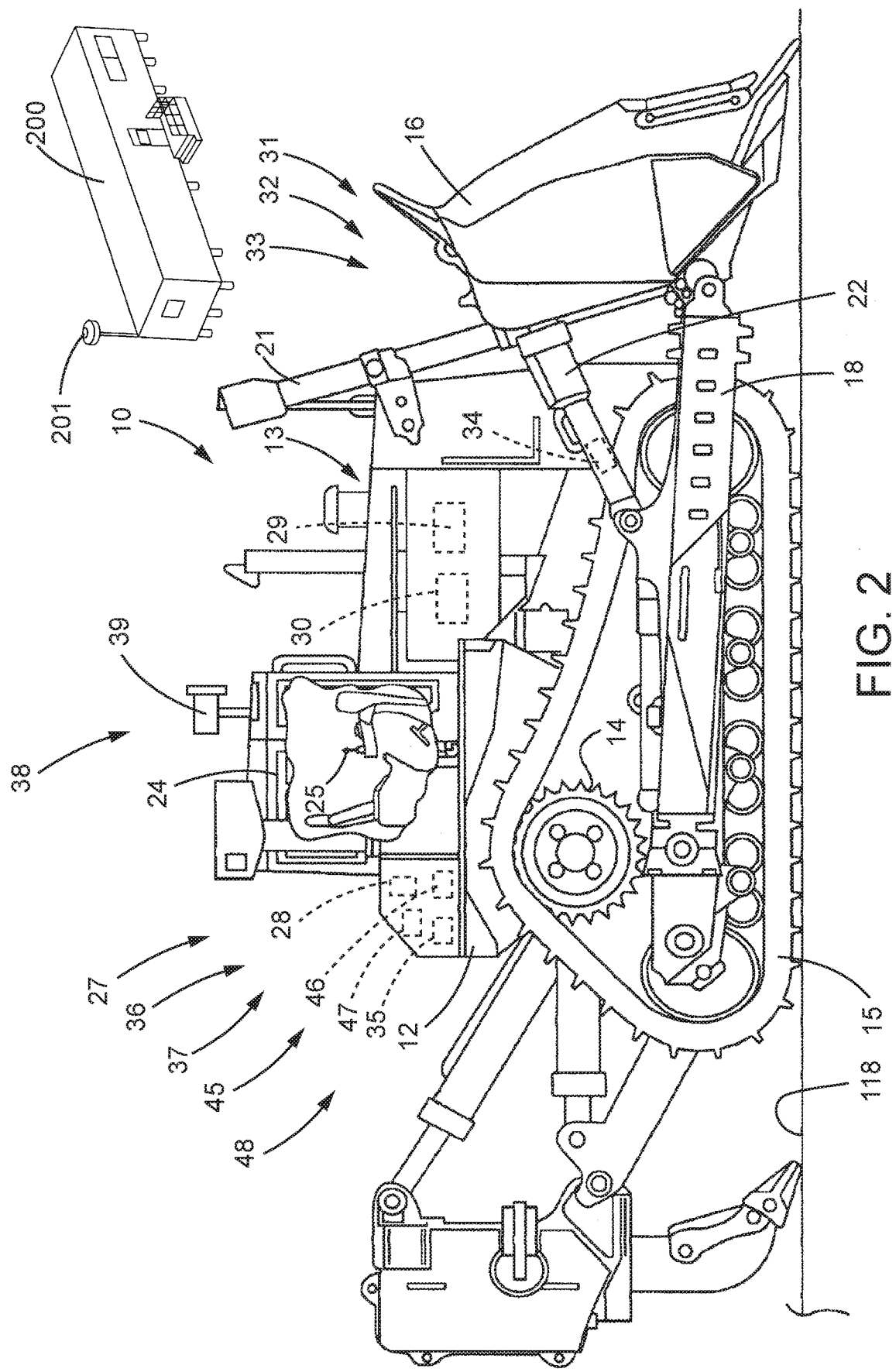
FIG. 2 depicts a diagrammatic illustration of a machine in accordance with the disclosure.

FIG. 2 depicts a diagrammatic illustration of a machine 10 such as a dozer with a work implement such as a blade 16 configured to push material. The machine 10 includes a frame 12 and a prime mover such as an engine 13. A ground-engaging drive mechanism such as a track 15 may be driven by a drive sprocket 14 on opposite sides of machine 10 to propel the machine. Engine 13 and a transmission (not shown) are operatively connected to the drive sprockets 14, which drive tracks 15. The systems and methods of the disclosure may be used with any machine propulsion and drivetrain mechanisms applicable in the art for causing movement of the machine including hydrostatic, electric, or mechanical drives.

Blade 16 may be pivotably connected to frame 12 by arms 18 on each side of machine 10. First hydraulic cylinder 21 coupled to frame 12 supports blade 16 in the vertical direction and allows blade 16 to move up or down vertically from the point of view of FIG. 2. Second hydraulic cylinders 22 on each side of machine 10 allow the pitch angle of blade tip to change relative to a centerline of the machine.

Machine 10 may include a cab 24 that an operator may physically occupy and provide input to control the machine. Cab 24 may include one or more operator input devices such as joystick 25 through which the operator may issue commands to control the propulsion system and steering system of the machine as well as operate various implements associated with the machine.

Machine 10 may be controlled by a control system 45 as shown generally by an arrow in FIG. 2 indicating association with the machine 10. The control system 45 may include an electronic control module or controller 46 and a plurality of sensors. The controller 46 may receive input signals from an operator operating the machine 10 from within cab 24 or off-board the machine through a wireless communications system 201. The controller 46 may control the operation of various aspects of the machine 10 including the drivetrain and the hydraulic systems.

The controller 46 may be an electronic controller that operates in a logical fashion to perform operations, execute control algorithms, store and retrieve data and other desired operations. The controller 46 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 46 such as power supply circuitry, signal conditioning circuitry, driver circuitry, and other types of circuitry.

The controller 46 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 46 may be implemented in hardware and/or software without regard to the functionality. The controller 46 may rely on one or more data maps relating to the operating conditions and the operating environment of the machine 10 and the work site 100 that may be stored in the memory associated with the controller. Each of these data maps may include a collection of data in the form of tables, graphs, and/or equations.

Figure 3:
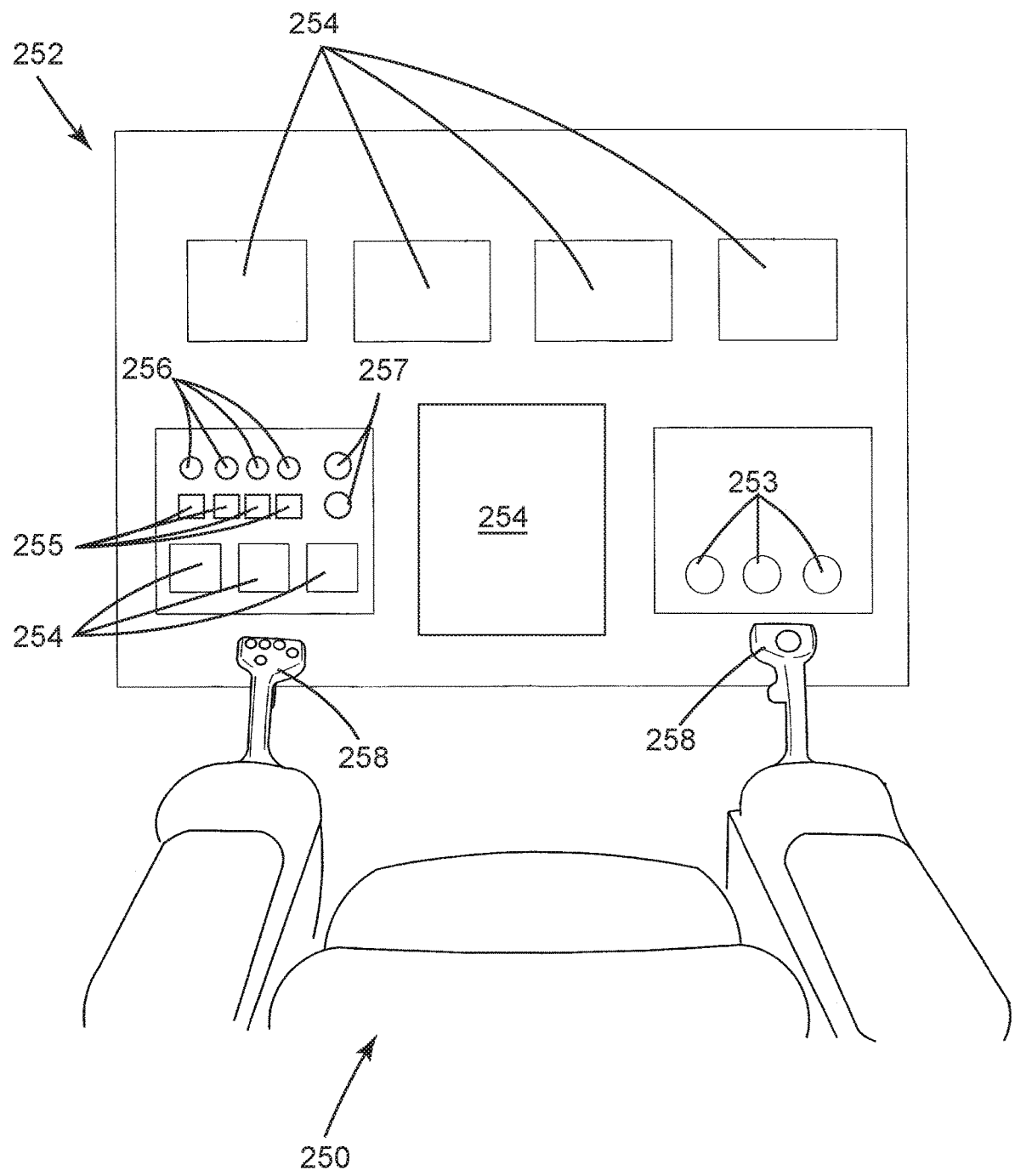
FIG. 3 depicts a schematic illustration of a portion of a remote control unit in accordance with the disclosure.

The control system 45 and the controller 46 may be located on the machine 10 and may also include components located remotely from the machine such as at a command center 200 or at a remote control unit 250 (FIG. 3). The functionality of control system 45 may be distributed so that certain functions are performed at machine 10 and other functions are performed remotely. In such case, the control system 45 may include a communications system such as wireless communications system 201 for transmitting signals between the machine 10 and a system located remote from the machine. In one embodiment, the remote control unit 250 positioned remote from the machine 10 may provide some or all of the specific commands that are then transmitted by the wireless communications system 201 to systems of the machine.

Machine 10 may be configured to be operated autonomously, semi-autonomously, or manually. When operating semi-autonomously or manually, the machine 10 may be operated by remote control and/or by an operator physically located within the cab 24.

Figure 4:
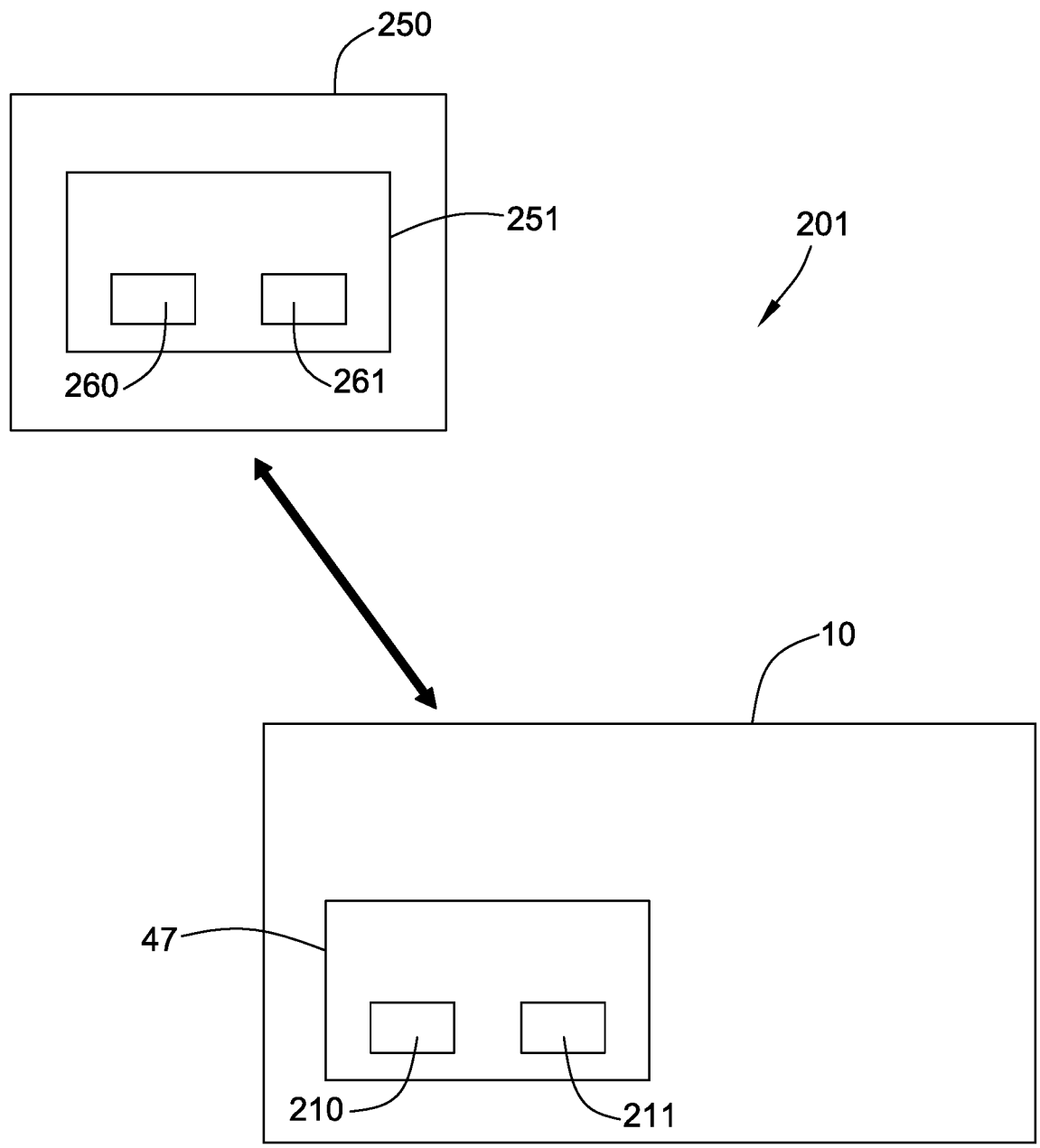
FIG. 4 depicts a schematic illustration of a wireless communications system in accordance with the disclosure.

When operating the machine 10 via a remote control system, a portion of the control system 45 may be located at the remote control unit 250. Accordingly, machine 10 may include a machine controller 47 and remote control unit 250 may include a remote unit controller 251 (FIG. 4). The machine controller 47 and the remote unit controller 251 may be components of controller 46.

Referring to FIG. 3, in one example, the remote control unit 250 may be configured with an instrument array 252 and controls similar to that of the machine 10 with a plurality of gauges 253, image display devices 254, and operator input devices such as buttons 255, knobs 256, dials 257, levers such as joysticks 258, and other controls. Signals from the various sensors on the machine 10 may be transmitted directly or indirectly to the remote control unit 250 and displayed on the instrument array. If desired, the remote control unit 250 may be configured in a manner similar to the actual cab 24 of the machine 10.

When operating machine 10 by remote control, the machine 10 and the remote control unit 250 may communicate via the wireless communications system 201. Each of the machine 10 and the remote control unit 250 may include wireless communication devices to permit wireless transmission of a plurality of data signals between the machine and the remote control unit as well as permit communication with other systems remote from the machine and the remote control unit.

As depicted in FIG. 4, machine 10 may include machine transmitter 210 and a machine receiver 211. The remote control unit 250 may include a remote control transmitter 260 and a remote control receiver 261. The transmitters and receivers may be a portion of the respective machine controller 47 and the remote unit controller 251, if desired. In operation, signals transmitted by the remote control unit 250 may be generated by the remote unit controller 251 and then transmitted by the remote control transmitter 260 to the machine receiver 211 and then processed by machine controller 47. Signals transmitted from the machine 10 to the remote control unit 250 may be generated by the machine controller 47 and then transmitted by the machine transmitter 210 to the remote control receiver 261 and then processed by remote unit controller 251.

Machine 10 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

A position sensing system 27, as shown generally by an arrow in FIG. 2 indicating association with the machine 10, may include a position sensor 28, also shown generally by an arrow in FIG. 2 to indicate association with the machine, to sense the position and orientation (i.e., the heading, pitch, roll or tilt, and yaw) of the machine relative to the work site 100. The position sensor 28 may include a plurality of individual sensors that cooperate to generate and provide position signals to controller 46 indicative of the position and orientation of the machine 10. In one example, the position sensor 28 may include one or more sensors that interact with a positioning system such as a global navigation satellite system or a global positioning system to operate as a position sensor. In another example, the position sensor 28 may further include a slope or inclination sensor such as pitch angle sensor for measuring the slope or inclination of the machine 10 relative to a ground or earth reference. The controller 46 may use position signals from the position sensors 28 to determine the position of the machine 10 within work site 100. In other examples, the position sensor 28 may include a perception based system, or may use other systems such as lasers, sonar, or radar to determine all or some aspects of the position of machine 10.

The position sensing system 27 may also be used to determine a ground speed of machine 10. Other sensors or a dedicated ground speed sensor may alternatively be used to determine the ground speed of the machine 10. In addition, the position sensing system 27 may also be used to determine the position of the work surface upon which the machine 10 is moving. More specifically, based upon known dimensions of the machine 10 and the position of the machine at the work site 100, the position of the work surface may also be determined. As a result, the position sensing system 27 may operate as either or both of a machine position sensing system and a work surface position sensing system. Similarly, the position sensor 28 may operate as either or both of a machine position sensor and a work surface position sensor. Other sensors or a dedicated work surface position sensor may alternatively be used to determine the position of the work surface.

Sensors may be provided to monitor the operating conditions of the engine 13 and drivetrain such as an engine speed sensor 29 and a torque converter speed sensor 30. Other sensors necessary or desirable for operating the machine 10 may be provided.

The control system 45 may include an additional system such as a change in terrain detection system 31 shown generally by an arrow in FIG. 2 indicating association with the machine 10. One type of change in terrain detection system 31 that may be used to sense a crest at the work site 100 may be an implement load monitoring system 32 shown generally by an arrow in FIG. 2. The implement load monitoring system 32 may include any of a variety of different types of implement load sensors depicted generally by an arrow in FIG. 2 as an implement load sensor system 33 to measure the load on the ground engaging work implement or blade 16. For example, as blade 16 of machine 10 moves material over a crest, the load on the blade will be reduced. Accordingly, the implement load sensor system 33 may be utilized to measure or monitor the load on the blade 16 and a decrease in load may be registered by the controller 46 as a change in terrain due to the machine 10 being adjacent the crest. In other instances, an increase in load may indicate an incline or the machine 10 encountering a pile of material. In other words, the controller 46 may determine a change in terrain based at least in part upon a change in the load on blade 16.

In one embodiment, the implement load sensor system 33 may embody one or more pressure sensors 34 for use with one or more hydraulic cylinders, such as second hydraulic cylinders 22, associated with blade 16. Signals from the pressure sensor 34 indicative of the pressure within the second hydraulic cylinders 22 may be monitored by controller 46. Upon receipt of a signal indicating a substantial reduction in pressure within the second hydraulic cylinders 22, the controller 46 may determine that the load on blade 16 has been substantially reduced due to the material having been pushed over a crest. Other manners of determining a reduction in cylinder pressure associated with a reduction in the load on blade 16 are contemplated, including other manners of measuring the pressure within second hydraulic cylinders 22 and measuring the pressure within other cylinders associated with the blade. An increase in pressure indicative of an increase in load may be determined in a similar manner.

In another embodiment, the implement load sensor system 33 may embody sensors for measuring a difference between output from the engine 13 and the output from a torque converter (not shown). More specifically, the engine speed sensor 29 may be utilized to generate a signal indicative of the speed or output of the engine 13 and the torque converter speed sensor 30 may be utilized to monitor the output speed of the torque converter. During an operation such as moving material with blade 16, the engine output speed indicated by engine speed sensor 29 and the torque converter output speed indicated by torque converter speed sensor 30 may be relatively constant. Upon moving material over a crest with blade 16, the load on the blade will be substantially reduced and thus cause a change in the relative speeds between the engine 13 and the torque converter. Similarly, an opposite change in relative speeds may also be used to determine an incline. Accordingly, by monitoring the difference between the engine speed and the torque converter speed, changes in incline may be determined.

Other manners of measuring differences between prime mover output and other components within the propulsion and drivetrain mechanisms that are reflective of a change in load on the implement are also contemplated. Still further, in alternate embodiments in which the machine propulsion and drivetrain mechanisms are hydrostatic or electric, the implement load sensor system may embody other sensors that detect a difference between output from the prime mover and other aspects of the propulsion and drivetrain mechanisms that may be used by the controller 46 to detect a change in load on the blade 16.

In still another embodiment, implement load sensor system 33 may embody an acceleration sensor such as a three-axis accelerometer 35 for providing an acceleration signal indicative of the acceleration of the machine 10. Upon moving a load of material past a crest, the machine 10 may accelerate due to the reduction in load on the blade 16. Similarly, deceleration of the machine 10 may indicate that the machine 10 has encountered an incline. Controller 46 may utilize acceleration of the machine 10 to determine a change in terrain.

In addition to the implement load monitoring systems 32 described above, other change in terrain detection systems may be used either alone or in combination with more than one change in terrain detection system. For example, a change in terrain detection system may use other sensors as a change in terrain sensor for determining a change in terrain. In one example, a pitch angle, as indicated by a pitch angle sensor 36, that exceeds a threshold pitch angle or is outside of an expected range of pitch angles may indicate that the machine 10 is adjacent a crest or an incline. In another example, a change in pitch rate as indicated by a pitch rate sensor 37 that exceeds a threshold rate may indicate that the machine 10 is adjacent a crest or an incline.

Still further, additional systems and sensors may be used to determine a change in terrain or proximity of machine 10 to a crest or an incline. For example, a perception system 38 may also be used to detect the physical location of a crest or an incline. The perception system 38 may be mounted on or associated with the machine, as shown generally by an arrow in FIG. 2 indicating association with the machine. The perception system 38 may include one or more systems such as a radar system, a SONAR system, a LIDAR system, a camera vision system, and/or any other desired system that operate with associated perception sensors 39. Perception sensors 39 may generate data that is received by the controller 46 and used by the controller to determine the position of the work surface upon which the machine 10 is operating including the presence and position of obstacles within the range of the sensors. If desired, the perception system 38 may be used to generate an electronic map and/or images of the environment around machine 10 and the environment analyzed for changes in terrain.

In addition or the alternative, the perception system 38 may include one or more perception sensors 39 movably associated with the machine 10 such as sensors mounted on a mobile machine or device including a drone or unmanned aerial vehicle (not shown).

Machine 10 may incorporate any or all of the change in terrain detection systems disclosed herein and may incorporate other systems that perform similar functions, if desired.

Machine 10 may be configured to move material at the work site 100 according to one or more material movement plans along a path from an initial location such as the first work area 110 to a spread or dump location such as the second work area 111. The material movement plans may include, among other things, forming a plurality of spaced apart channels or slots 117 (FIG. 5) that are cut into the work surface to assist in moving material from the initial location to the spread or dump location by using a plurality of cut and carry operations.

Figure 6:
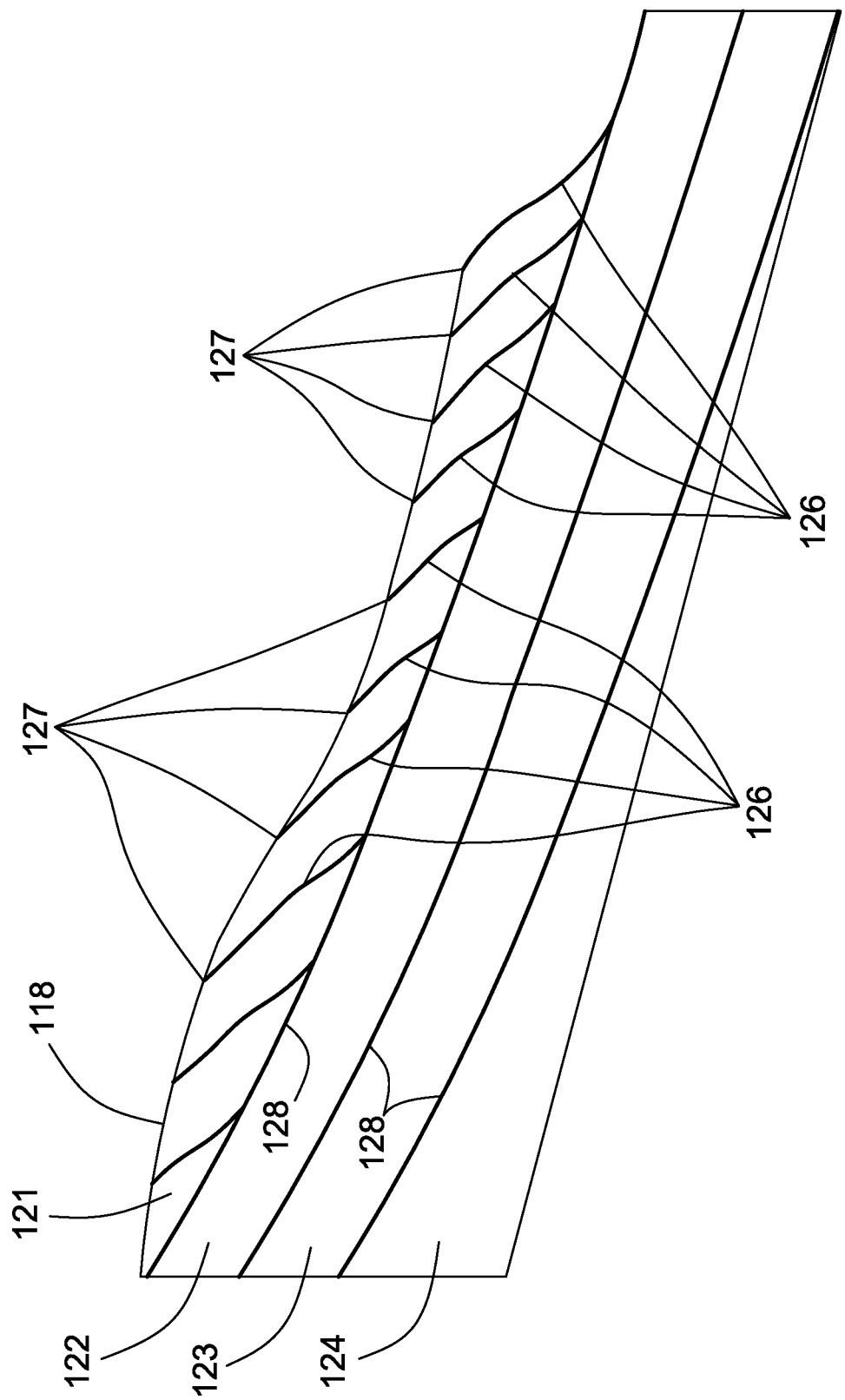
FIG. 6 depicts an enlarged diagrammatic cross-section of a portion of a work site illustrating a plurality of cutting operations.

Each slot 117 may be formed by initially setting the desired parameters of the final work surface or final design plane such as the upper surface of the lower layer 102. Referring to FIG. 6, material may be removed from the work surface 118 in one or more layers or passes (e.g., smaller layers 120-125) until the final design plane is reached. While the illustration is depicted in two dimensions, it should be appreciated that the data representing the illustration may be in three dimensions. The blade 16 of machine 10 may engage the work surface 118 with a series of cuts 126 that are spaced apart lengthwise along the slot 117. Each cut 126 begins at a cut location 127 along the work surface 118 wherein the blade 16 initially engages the work surface and is loaded with material as the blade moves towards the pass target or carry surface 128 for a particular pass. In other words, when cutting smaller layer 121, the blade 16 begins at the upper surface of the layer 121 and cuts through the layer until reaching the next vertically sequential smaller layer 122. Controller 46 may be configured to guide the blade 16 along each cut 126 until reaching the carry surface 128 and then follow the carry surface towards the second work area 111.

The shape of the cut 126 or loading profile may have any configuration and, depending on various factors including the configuration of the work surface 118 and the type of material to be moved, some cut profiles may be more efficient than others. The loading profile may be formed of one or more segments that are equal or unequal in length and with each having different or identical shapes. These shapes may be linear, symmetrically or asymmetrically curved, Gaussian-shaped or any other desired shape. In addition, the angle of any of the shapes relative to the work surface 118 or the final design plane may change from segment to segment.

The shape of the carry surface 128 or carry profile may have any configuration but is often generally linear and sloped downward so that movement of material will be assisted by gravity to increase the efficiency of the material moving process. In other words, the carry profile is often configured so that it slopes downward towards the second work area 111.

When operating autonomously or semi-autonomously, the controller 46 may be configured to guide the machine 10 to execute each cut operation and carry the material along the carry surface to the second work area 111.

Figure 7:
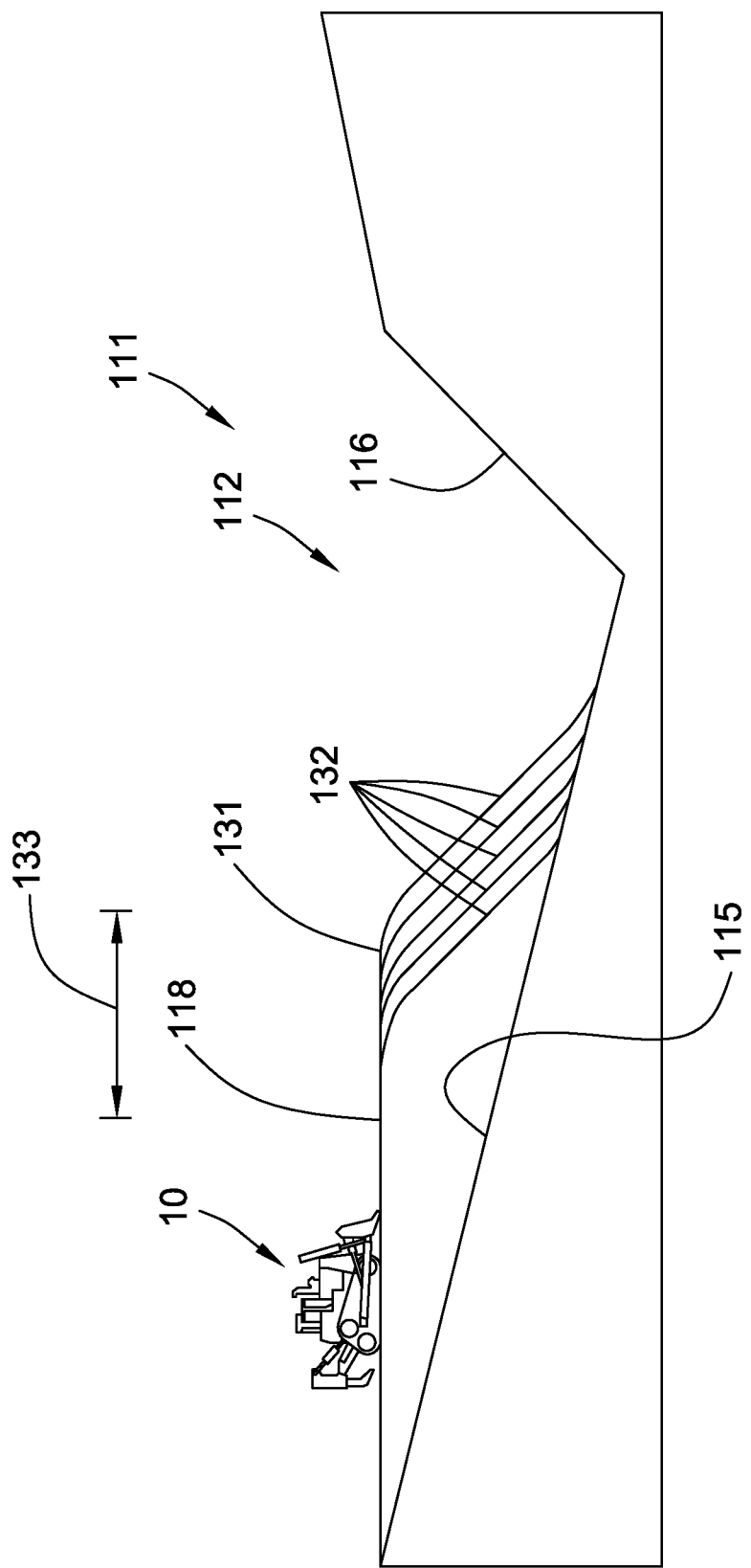
FIG. 7 depicts an enlarged diagrammatic cross-section of a portion of the work site of FIG. 1 illustrating the result of a plurality of tip head operations.

Referring to FIG. 7, a first process for spreading or dumping material at the second work area 111 involves pushing the material or overburden along the work surface 118 until reaching a downward slope or crest 131. Upon reaching the crest 131, the overburden will fall down the slope along the crest. The process of dumping material over a crest 131 and allowing the material to fall at the angle of repose due to gravity may sometimes be referred to as tip head dumping. In FIG. 7, examples of material dumped by a plurality of tip head dumping cycles are depicted schematically at 132.

As the material being pushed by machine 10 falls downward due to gravity, the load on the machine 10 and blade 16 will decrease. The change in terrain detection system 31 may utilize the implement load monitoring system 32 or any other system such as a perception system 38 to generate change in terrain signals that indicate a change in terrain adjacent machine 10. Upon the change in terrain exceeding a change in terrain threshold, the controller 46 may generate command signals to move the machine 10 in reverse. The machine 10 may then be operated in reverse to back up along the path of operation until reaching the next cut location and the next sequential material moving operation performed.

In some embodiments, the machine 10 may utilize the position sensing system 27 in conjunction with one or more crest detection systems. A crest zone 133 may be set that extends rearwardly a predetermined distance (e.g., 20-30 feet) from an estimated location of the crest 131 to a beginning location 134 of the crest zone. The controller 46 may utilize a first set of data in connection with the crest detection system when outside or spaced from the crest zone 133 and a second set of data when the machine 10 is operating within the crest zone. For example, when operating at a location spaced from the crest zone 133, the machine 10 is at a lower risk so greater changes in terrain may be tolerated or permitted. In other words, in view of the significant risk when operating near the crest 131, the sensitivities or responsiveness of the crest detection systems may be increased when operating within the crest zone 133 so that the controller 46 is more likely to stop or reverse the machine 10 if a significant change in terrain is detected.

Figure 8:
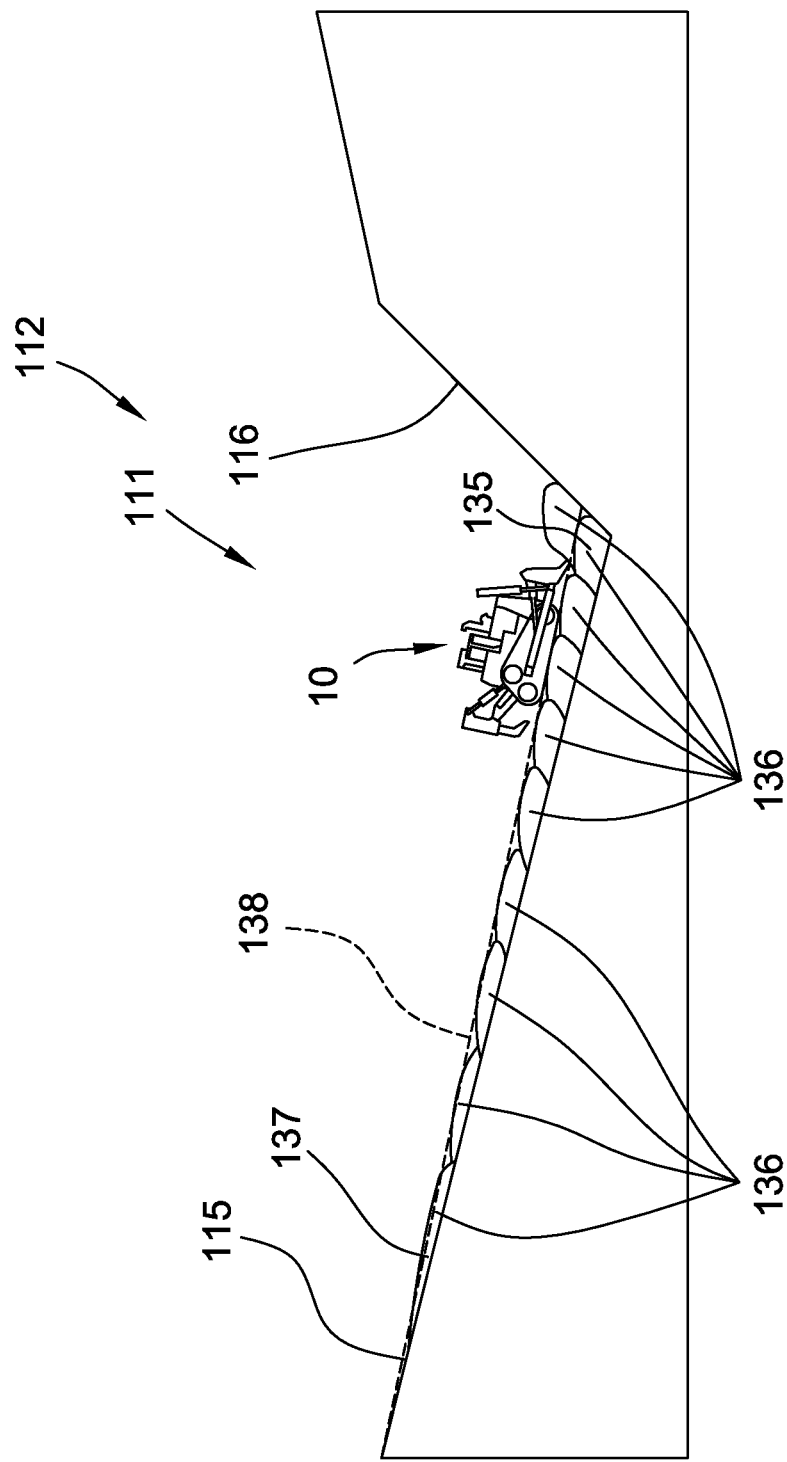
FIG. 8 depicts an enlarged diagrammatic cross-section of a portion of the work site of FIG. 1 illustrating the result of a plurality of backstacking operations.

Referring to FIG. 8, a second process for spreading or dumping material involves pushing the material or overburden along the work surface until reaching a desired end of travel location. Upon reaching the desired end location or distal end dump location 135, the machine 10 is operated in reverse which leaves a pile 136 of material on the work surface along which the machine is operating. The machine 10 is moved in reverse along the path of operation until reaching the next cut location and the next sequential material moving operation is performed. Upon reaching the location of the last pile 136 of material in the current layer of material (i.e., the proximal end dump location 137), a new layer of material may be formed by moving the machine 10 to the distal end dump location of the next sequential layer of material.

In one embodiment, subsequent end of travel locations within a layer may be identified when the material being pushed by blade 16 engages the previously deposited pile 136 of material. Systems such as those used to monitor a change in terrain may detect when the material being pushed engages a previous pile 136 of material. More specifically, engagement or interaction of material being pushed with a previous pile 136 of material may be monitored by a change in load on the machine 10 and/or blade 16, deceleration of the machine, and/or a change in pitch angle of the machine. Other systems such the perception system 38 may be used in addition or instead.

In another embodiment, a planning system 48 of the control system 45 may calculate or determine a plurality of end locations at which the machine 10 should cease forward movement and back up. The end locations may be determined so that the machine 10 leaves the piles 136 of material in the desired location upon generating a reversing command or instructions.

Upon reaching a desired position at which the layer of material should end, a new layer (indicated in dashed line at 138) of piles 136 of material may be begun and the process repeated. In some instances, the machine 10 may be used to smooth the surface of the piles 136 of material to create a generally uniform surface prior to beginning a new layer of piles. The process of reversing the machine 10 to form layers of material by leaving sequential piles 136 of material as described above may sometimes be referred to as backstacking.

Each of the processes for cutting, carrying, and spreading or dumping the material may be performed autonomously, semi-autonomously, or manually, if desired. Other manners of spreading or dumping material at the second work area 111 are contemplated.

Control system 45 may include a module or planning system 48 for determining or planning various aspects of a material moving plan. The planning system 48 may determine the depth and location of each of the layers 120-125. In addition, the planning system 48 may determine the sequential cut locations 127 along each layer as well as the shape of the cuts 126 or loading profile through each layer. The planning system 48 may also be operative to plan other aspects of the material moving plan. For example, the planning system 48 may also determine the end locations for the piles 136 of material during a backstacking process. The planning system 48 may receive and store the characteristics of the material to be moved (e.g., density, moisture content, compactability, angle of repose) that may be used in the planning process.

Figure 5:
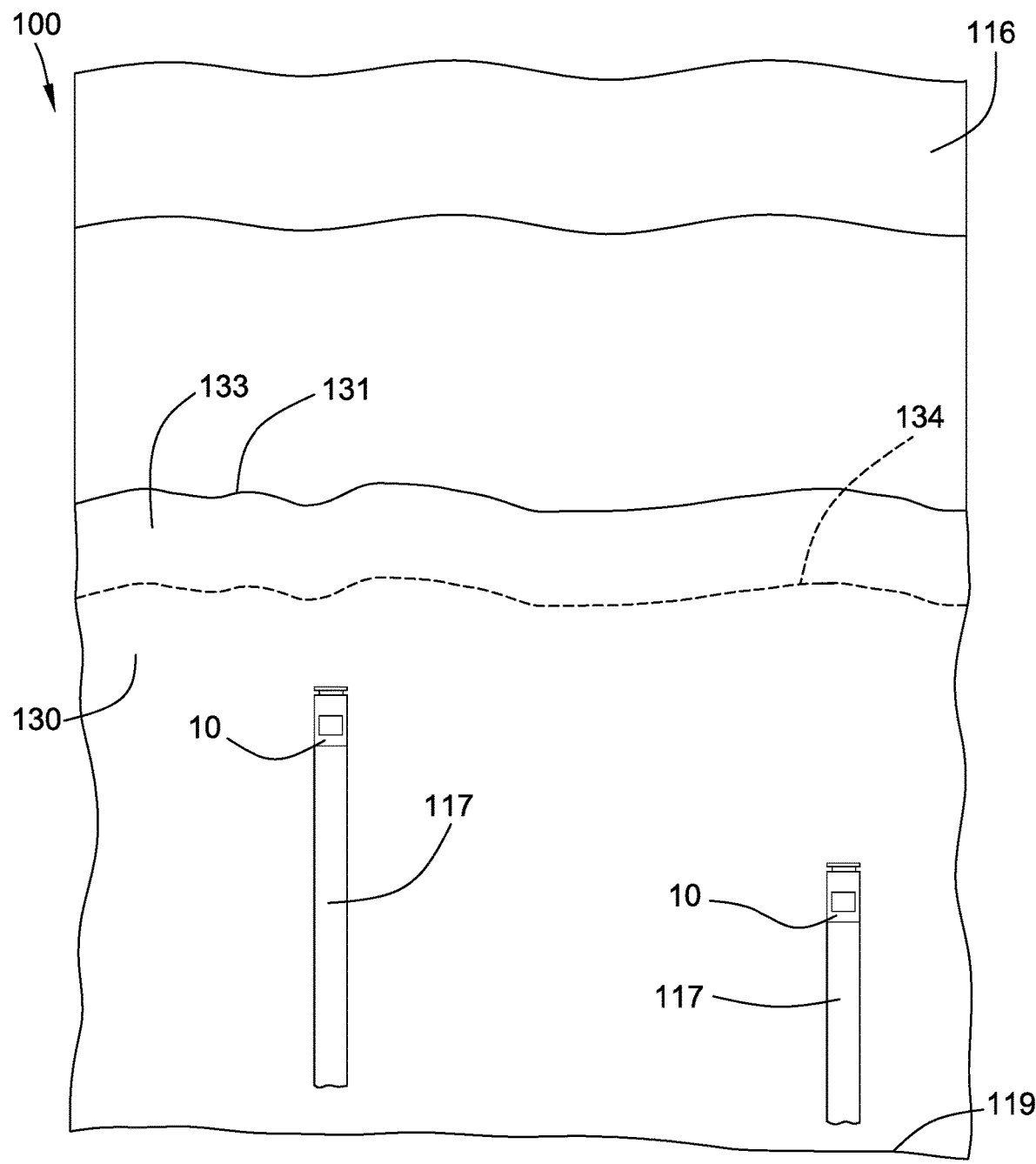
FIG. 5 depicts a top view of the portion of the work site of FIG. 1.

During the operation of the machine 10 and/or the planning system 48, the controller 46 may generate commands to display various aspects of the work site 100 on one of the image display devices 254. The aspects of the work site 100 may be displayed as a side view or a view of portions of the work site 100 including the path of the machine 10. FIGS. 1 and 6-8 depict examples of such side views. FIG. 5 depicts an example of such a top view.

The side views of the work site 100 define a plurality of operational location along the work site. As used herein, an operational location is a location such as a point, at, above, or below the path 129 (FIG. 1) along which the machine 10 may operate, or is a location that may be used by the planning system 48 to define a location at, above, or below the path. It should be noted that, as stated above, the depicted views are in two dimensions, the data representing the depicted views may be in three dimensions. Accordingly, a point as depicted in a side view may correspond to a line that extends across the path 129 at the designated point.

For example, at the first work area 110, the location of a cut location 127 may be an operational location. The shape of the cut 126 or loading profile, the shape and location of the smaller layers 120-125, the shape and location of the final design plane, and the shape and location of high wall 119 (FIG. 1), may all be defined by two or more operational locations. In other words, two or more operational locations may define a line at the work site 100 and the two-dimensional line depicted in a side view may correspond to a three-dimensional plane or surface.

At the second work area 111, when performing a tip head material movement operation at the second work area 111, the location of the crest 131 and the beginning location 134 of the crest zone 133 may each be an operational location. When performing a backstacking operation at the second work area 111, the initial end of travel location for a backstacking layer or distal end dump location 135, the location of a previous pile 136 of material in a backstacking operation, and the last end of travel location for a backstacking layer or proximal end dump location 137 may each be an operational location. In addition, two or more operational locations may define the shape and location of the low wall 116. Other operational locations at both the first work area 110 and the second work area 111 are contemplated.

The control system 45 and planning system 48 may be configured to permit an operator or other personnel to modify or move one or more of the operational locations depicted on one of the image display devices 254 to define a modified operational location. In one embodiment, an operational location may be modified or moved with a "drag and drop" operation. In another embodiment, an operational location may be modified or moved by initially selecting the operational location using an operator input device, moving the operational location with another operator input device to a desired location, and selecting the new operational location with an operator input device. Other manners of moving the operational locations as depicted on the image display device 254 are contemplated.

Upon changing one or more operational locations, the planning system 48 may be configured to generate new or modified material movement plan based upon the position of the work surface and the new position of the operational location or locations. Accordingly, the planning system 48 may generate an initial material movement plan based upon the position of the work surface and various operational settings. Upon moving an operational location to define a modified operational location, the planning system 48 may generate a new material movement plan based upon the position of the work surface and the modified operational location.

In one example, an operator or other personnel may change the position of one or more operational locations to change the position of a cut location 127 the shape of a cut or loading profile, the shape and location of the smaller layers 120-125, the shape and location of the final design plane, or the shape and location of high wall 119. Modifying or moving the position of one or more operational locations at the first work area may modify the manner in which the machine 10 operates to move material at the first work area 110.

In another example, when using a tip head dumping operation, an operator or other personnel may change the position of an operational location to change the beginning location of the crest zone 133. In still another example, a similar result may be achieved by modifying an estimated location of the crest 131. It may be desirable to move the estimated location of the crest 131 as the void 112 at the second work area 111 is filled in to increase the likelihood that the machine 10 will not reverse before reaching the crest 131. In some instances, an operator or other personnel may determine that a portion of the crest 131 has collapsed and thus it is desirable to move the estimated location of the crest rearward or towards the first work area 110.

In still another example, when using a backstacking operation, an operator or other personnel may change the position of an operational location to move the initial position or distal end dump location for a backstacking operation or the end position or proximal end dump location for a backstacking operation. By doing so, the starting location, the ending location, and/or the configuration of the backstacking layer may be modified.

INDUSTRIAL APPLICABILITY

The industrial applicability of the system described herein will be readily appreciated from the forgoing discussion. The foregoing discussion is applicable to systems in which a plurality of machines 10 are operated autonomously, semi-autonomously, or manually at a work site 100 where it is desirable to move material from a first work area 110 to a second work area 111. Such systems may be used at a mining site, a landfill, a quarry, or any other area in such movement of material is desired.

Figure 9:
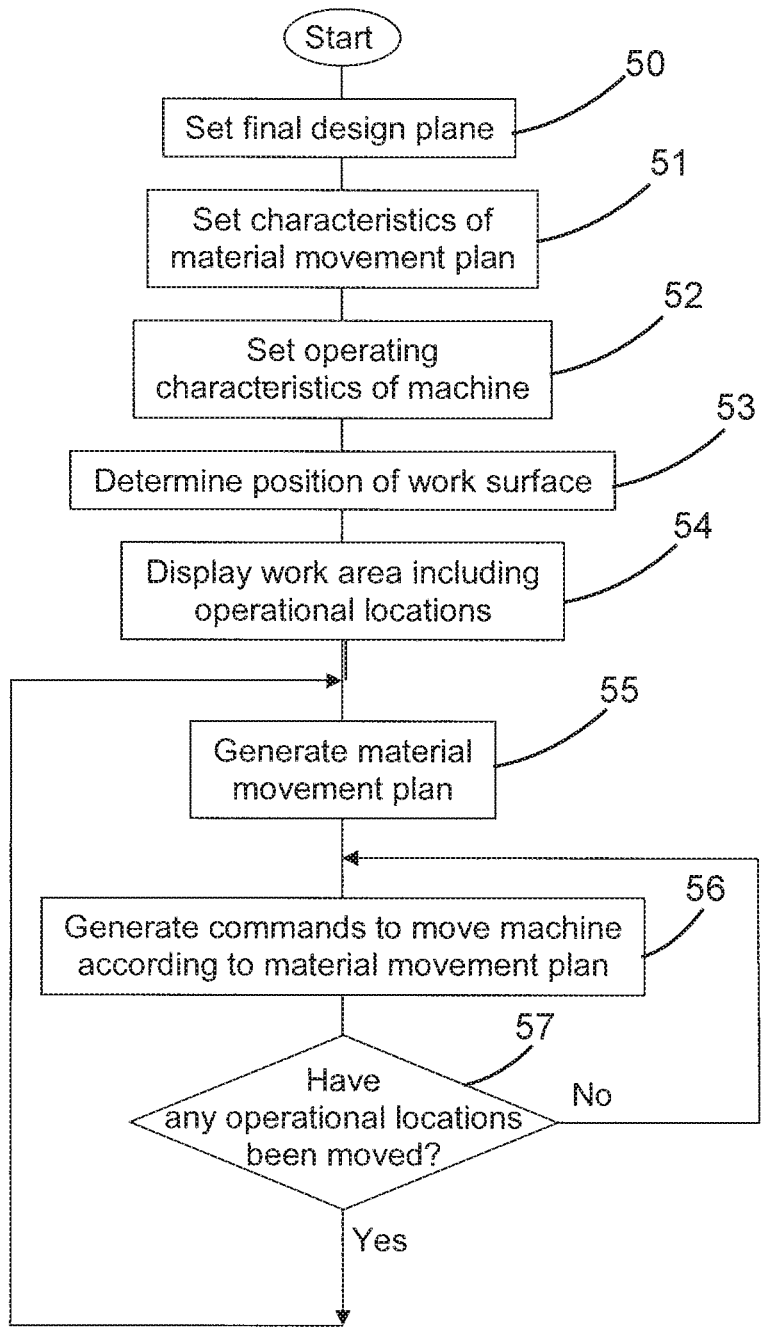
FIG. 9 depicts a flowchart illustrating a material moving process in accordance with the disclosure.

FIG. 9 depicts a flow chart of an example of a material moving operation in which overburden is moved from the first work area 110 to the second work area 111. At stage 50, the final design plane may be set or stored by controller 46. In some instances, the final design plane may correspond to the upper surface of the lower layer 102 of material. The characteristics of the material movement plan may be set or stored by controller 46 at stage 51. The characteristics may include parameters of the slot 117, the shape or possible shapes of each cut 126 or loading profile, the size of the crest zone 133 when using a tip head material movement operation, details of the proximal and distal end dump locations when using a backstacking material movement operation, as well as characteristics of the material to be moved.

The characteristics of the machine 10 may be set or stored at stage 52 by the controller 46. The characteristics of the machine 10 may include the dimensions, maximum and desired operating ranges and capabilities, as well as fuel consumption rates. At stage 53, the position or topography of the work surface may be determined. In some instances, the position of the work surface 118 may only be determined at the first work area 110. In other instances, the position of the work surface at the second work area 111 may also be determined. In one embodiment, a machine 10 such as the dozer including the position sensing system 27 and/or a perception system 38 may traverse the work surface. In another embodiment, the position of the work surface may be determined by position sensors operatively associated with a remote machine or device such as a drone or unmanned aerial vehicle.

The controller 46 may generate at stage 54 commands to display portions of the work site 100 on an image display device. The displayed portion of the work site may include a side view and/or a top view of the path along which the machine 10 may be moving. The side view and/or top view may include one or more operational locations at, above, or below the path along which the machine 10 may operate, or that may be used by the planning system 48 to define a location at, above, or below the path.

At stage 55, the controller 46 may generate a material movement plan based upon the position or topography of the work surface and one or more of the operational locations. The controller 46 may generate at stage 56 commands to move the machine according to the material movement plan to move material from the first work area 110 to the second work area 111.

The controller may determine at decision stage 57 whether any operational locations have been moved on the image display device by an operator or other personnel. If none of the operational locations have been moved, operation of the machine 10 to continue to perform the material movement operations may be continued and stages 56-57 repeated. If an operational location has been moved, stages 55-57 may be repeated. In doing so, the controller 46 may generate a new or modified material movement plan based upon the location of the work surface and one or more of the operational locations including the modified operational location. It should be noted that in some instances, the modified operational location may not affect certain aspects of the material movement plan. In other words, in some instances, the new material movement plan may be identical to the previous or initial material movement plan.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for moving material along a path with a work implement on a machine at a work site, comprising:
   an image display device;
   an operator input device for an operator of the system; and
   a position sensor for generating position signals indicative of a position of a work surface at the work site; and
   a controller configured to:
   receive position signals from the position sensor;
   determine the position of the work surface based upon the position signals;
   display an image of a portion of the work site on the image display device, the image including an operational location along the path at the work site;
   receive a command from an operator using the operator input device to modify the image of a position of the operational location on the image display device, the modified position of the operation location defining a modified operational location and displaying a modified image of the modified operational location on the image display device;
   generate a material movement plan based upon the position of the work surface and the modified operational location; and
   generate command instructions to move the machine according to the material movement plan.

2. The system of claim 1, further including, prior to modifying the operational location, the controller being configured to generate an initial material movement plan based upon the position of the work surface and the operational location; and generate command instructions to move the machine according to the initial material movement plan.

3. The system of claim 1, wherein the controller is further configured to store a configuration of a final design plane and generate the material movement plan based upon a configuration of the final design plane.

4. The system of claim 1, wherein the controller is further configured to modify the image of the position of the operational location on the image display device with the operator input device using a drag and drop process.

5. The system of claim 1, wherein the modified operational location is an estimated location of a crest along a path of the machine associated with a tip head material movement operation.

6. The system of claim 5, wherein modifying the operational location includes extending the path adjacent the crest.

7. The system of claim 5, wherein modifying the operational location includes reducing a length of the path adjacent the crest.

8. The system of claim 1, further comprising a crest detection system, the modified operational location is a beginning location of a crest zone, and the controller is configured to store a first set of data in connection with the crest detection system when spaced from the crest zone and a second set of data when operating within the crest zone.

9. The system of claim 1, wherein the modified operational location is a dump location along a path of the machine associated with a backstacking material movement operation.

10. The system of claim 9, wherein the dump location is a distal end dump location.

11. The system of claim 9, wherein the dump location is a proximal end dump location.

12. The system of claim 1, wherein the modified operational location is indicative of an estimated position of a low wall.

13. The system of claim 12, wherein the estimated position of the low wall is indicated by a plurality of modified operational locations.

14. The system of claim 1, wherein the controller is further configured to modify the image of a position of two operational locations on the image display device with the operator input device to define two modified operational locations, the two modified operational locations defining a plane.

15. A controller-implemented method of moving material along a path with a work implement on a machine, comprising:
   receiving position signals from a position sensor indicative of a position of a work surface at a work site;
   determining the position of the work surface based upon the position signals;

displaying an image of a portion of the work site on an image display device, the image including an operational location along the path at the work site;

receiving a command from an operator using the operator input device to modify the image of a position of the operational location on an image display device, the modified position of the operation location defining a modified operational location and displaying a modified image of the modified operational location on the image display device;

generating a material movement plan based upon the position of the work surface and the modified operational location; and generating command instructions to move a machine according to the material movement plan.

16. The method of claim 15, further including, prior to modifying the operational location, generating an initial material movement plan based upon the position of the work surface and the operational location; and generating command instructions to move the machine according to the initial material movement plan.

17. The method of claim 15, further including modifying the image of the position of the operational location on the image display device with the operator input device using a drag and drop process.

18. The method of claim 15, wherein the modified operational location is a dump location along a path of the machine associated with a backstacking material movement operation.

19. The method of claim 15, further including modifying the image of a position of two operational locations on the image display device with the operator input device to define two modified operational locations, the two modified operational locations defining a plane.

20. A machine comprising:
a prime mover;
a work implement for moving material at a work site;
an image display device;
an operator input device for an operator of the machine;
a position sensor for generating position signals indicative of a position of a work surface at the work site; and
a controller configured to:
receive position signals from the position sensor;
determine the position of the work surface based upon the position signals;
display an image of a portion of the work site on the image display device, the image including an operational location along a path at the work site, the machine being configured to move material along the path;
receive a command from an operator using the operator input device to modify the image of a position of the operational location on the image display device, the modified position of the operation location defining a modified operational location and displaying a modified image of the modified operational location on the image display device;
generate a material movement plan based upon the position of the work surface and the modified operational location; and
generate command instructions to move the machine according to the material movement plan.

* * * * *